United States Patent
Zhang et al.

(10) Patent No.: US 12,485,502 B2
(45) Date of Patent: Dec. 2, 2025

(54) METHOD AND SYSTEM FOR ADAPTIVE REPAIR OF FREEFORM SURFACE, DEVICE AND MEDIUM

(71) Applicant: Jinan Ruiheng Zhiyuan Intelligent Technology Co., Ltd., Jinan (CN)

(72) Inventors: Chengrui Zhang, Jinan (CN); Yisheng Yin, Jinan (CN)

(73) Assignee: Jinan Ruiheng Zhiyuan Intelligent Technology Co., Ltd., Jinan (CN)

( * ) Notice: Subject to any disclaimer, the term of this patent is extended or adjusted under 35 U.S.C. 154(b) by 0 days.

(21) Appl. No.: 19/183,809

(22) Filed: Apr. 19, 2025

(65) Prior Publication Data

US 2025/0353109 A1 Nov. 20, 2025

(30) Foreign Application Priority Data

May 17, 2024 (CN) .......................... 202410615316.5

(51) Int. Cl.
*B23K 26/08* (2014.01)
*B23K 26/21* (2014.01)

(52) U.S. Cl.
CPC .......... *B23K 26/0876* (2013.01); *B23K 26/21* (2015.10)

(58) Field of Classification Search
CPC ............................ B23K 26/21; B23K 26/0876
USPC ..................................................... 219/121.64
See application file for complete search history.

(56) References Cited

PUBLICATIONS

CNIPA, Notification of a First Office Action for CN202410615316. 5, Dec. 11, 2024.
Shandong University (Applicant), Replacement claims (allowed) of CN202410615316.5, Jan. 13, 2025.
CNIPA, Notification to grant patent right for invention in CN202410615316.5, Feb. 26, 2025.

*Primary Examiner* — Ibrahime A Abraham
*Assistant Examiner* — Joseph W Iskra
(74) *Attorney, Agent, or Firm* — Zhigang Ma

(57) ABSTRACT

A method for adaptive repair of a freeform surface includes: performing data discretization on a worn workpiece to obtain a worn body to be repaired, and performing adaptive segmentation on the worn body to be repaired to obtain initial reference surfaces, wherein the initial reference surfaces include a worn model bottom surface and a standard model top surface; constructing a freeform surface slice based on each of the initial reference surfaces; calculating surface curvature distribution data of the freeform surface slice, and constructing a curvature-overlapping pitch optimization model to perform adaptive trajectory filling on the freeform surface slice to obtain freeform surface scanning trajectories; and performing topological sorting on scanning trajectory points of the freeform surface scanning trajectories to obtain processing trajectories, fitting the processing trajectories, and performing adaptive repair on the freeform surface. This method eliminates a severe "staircase effect" in a traditional slicing method.

6 Claims, 12 Drawing Sheets

METHOD AND SYSTEM FOR ADAPTIVE REPAIR OF FREEFORM SURFACE, DEVICE AND MEDIUM

CROSS-REFERENCE TO RELATED APPLICATION

This application claims priority to Chinese Patent Application No. 202410615316.5, filed on May 17, 2024, which is herein incorporated by reference in its entirety.

TECHNICAL FIELD

The disclosure relates to the field of surface repair technologies, and more particularly to a method and a system for adaptive repair of a freeform surface, a device and a medium.

BACKGROUND

Freeform surfaces have smooth profiles and excellent aerodynamic properties, and are widely used as specialized functional surfaces in various industries such as aerospace, automotive, and mold manufacturing. Some core functional parts, such as turbine blades, engine crankshafts, and cold stamping molds, often operate under harsh conditions such as high temperatures, high pressures, overloading, high impacts, vibrations, and susceptibility to fatigue; and thus after long-time work and service, they are prone to be worn, leading to decline in the performance of the core parts or even scrapping of the core parts. Since productions of these core functional parts often requires the use of special engineering materials and relatively complex processing processes, remanufacturing and processing on basis of faulty parts to restore their functions and performances, as compared to manufacturing new parts, is more energy-saving, material-saving, time-saving, economical, and environmentally friendly.

Due to increased complexities of freeform surface parts compared to traditional planar surfaces and rotational surfaces, adaptive repairs of the freeform surface parts face many challenges. On one hand, a traditional curved surface repair usually employs a planar slicing method and repairs a defective body in a form of planar stacking, the slicing method and its trajectory filling method are relatively simple and thus widely used in repairing traditional planar parts. However, a surface morphology of a freeform surface is relatively complex, and the traditional planar slicing method cannot achieve sufficient conformal integration/fusion with the freeform surface base. Moreover, there is a severe "staircase effect", and a continuity between layered slices is poor, which easily results in fragmented trajectories, leading to significant shortcomings in repair quality and efficiency, thereby making it difficult to meet requirements of repairing freeform surfaces. On the other hand, the trajectory filling method in the traditional repair usually uses a fixed overlapping pitch, which is suitable for trajectory planning in surface repairing of planar workpieces. However, a surface curvature of the freeform surface is dynamically changing, and the traditional method of using the fixed overlapping pitch would lead to a serious problem of uneven repaired layer thickness, more specifically, a thickness of cladding layer formed on a convex surface tends to be too thin, while a thick of cladding layer formed on a concave surface tends to be too thick, which would greatly reduce surface quality and processing accuracy of repair processing.

In a conventional method, a three-dimensional printing path planning method and system based on freeform surface slicing has been proposed. The conventional method takes into account issues of surface path planning technology, such as deformation of surface model due to gravitational compression, significant structural deformation caused by a material not yet solidifying, and low printing accuracy. However, a slicing method of fixed-direction equidistant offset used in the conventional method cannot adapt to worn repair scenarios of freeform surfaces. When slicing a worn defect entity of a freedom surface, a final formed top surface still has a severe "staircase effect". On one hand, surface quality and accuracy of the top surface are poor and cannot meet requirements for surface waviness of the final repaired top surface in a freeform surface repair scenario. On the other hand, the presence of a large number of fragmented slicing trajectories would greatly reduce efficiency of repair processing.

Sum up, faced with requirements of low surface waviness and high processing efficiency in freeform surface repair scenarios, there is currently no effective method for adaptive surface slicing and trajectory planning for laser repair.

SUMMARY

A purpose of the disclosure is to provide a method and a system for adaptive repair of a freeform surface, a device and a medium, so as to solve problems in the related art.

To achieve the above purpose, an embodiment of the disclosure provides a method for adaptive repair of a freeform surface, including:
step 1, performing data discretization on a worn workpiece to obtain a worn body to be repaired, and performing adaptive segmentation on the worn body to be repaired to obtain initial reference surfaces, where the initial reference surfaces include a worn model bottom surface and a standard model top surface;
step 2, constructing a freeform surface slice based on each of the initial reference surfaces;
step 3, calculating surface curvature distribution data of the freeform surface slice, and constructing a curvature-overlapping pitch optimization model to perform adaptive trajectory filling on the freeform surface slice to obtain freeform surface scanning trajectories; and
step 4, performing topological sorting on scanning trajectory points of the freeform surface scanning trajectories to obtain processing trajectories, fitting the processing trajectories, and performing adaptive repair on the freeform surface.

In an embodiment, the step 1 specifically includes:
performing the data discretization individually on a standard workpiece and the worn workpiece to obtain a standard point cloud model and the worn body to be repaired, and calculating difference values between the worn body to be repaired and the standard point cloud model through point-by-point iteration; and
performing the adaptive segmentation on the worn body to be repaired based on the difference values to thereby obtain the initial reference surfaces.

In an embodiment, the step 2 specifically includes:
calculating normal vectors of discrete points on each of the initial reference surfaces, constructing tangent sphere models of the respective discrete points on each of the initial reference surfaces based on the normal vectors, and creating an envelope surface tangent to the tangent sphere models as a freeform surface slice.

In an embodiment, the step 3 specifically includes:
based on the surface curvature distribution data, constructing the curvature-overlapping pitch optimization model according to an equal-volume overlapping model;
setting an initial trajectory plane and a distance threshold, obtaining distance data of discrete points in the freeform surface slice to the initial trajectory plane, judging the distance data of the respective discrete points based on the distance threshold, saving discrete points with the distance data less than the distance threshold, and constructing an initial scanning trajectory based on saved discrete points;
iteratively calculating overlapping pitch optimization points of respective scanning trajectory points on the initial scanning trajectory, and generating a neighboring overlapping trajectory based on the overlapping pitch optimization points; and
performing the adaptive trajectory filling of the freeform surface slice based on the neighboring overlapping trajectory, thereby obtaining the freeform surface scanning trajectories.

In an embodiment, the step 4 specifically includes:
performing the topological sorting on the scanning trajectory points of the freeform surface scanning trajectories to obtain topologically sorted scanning trajectory points, using the topologically sorted scanning trajectory points as processing points, inserting safety points between different ones of the freeform surface scanning trajectories based on the processing points to obtain the processing trajectories, fitting the processing trajectories using a non-uniform rational B-spline (NURBS) curve, and performing the adaptive repair on the freeform surface.

A system for adaptive repair of a freeform surface, includes:
a to-be-repaired body construction module, configured to perform data discretization on a worn workpiece to obtain a worn body to be repaired, and perform adaptive segmentation on the worn body to be repaired to obtain initial reference surfaces, where the initial reference surfaces include a worn model bottom surface and a standard model top surface;
an adaptive trajectory filling module, configured to construct a freeform surface slice based on each of the initial reference surfaces; and configured to calculate surface curvature distribution data of the freeform surface slice, and configured to construct a curvature-overlapping pitch optimization model to perform adaptive trajectory filling on the freeform surface slice to thereby obtain freeform surface scanning trajectories; and
a fitting module, configured to perform topological sorting on scanning trajectory points of the freeform surface scanning trajectories to obtain processing trajectories, fit the processing trajectories, and perform adaptive repair on the freeform surface.

An electronic device includes a memory and a processor. The memory is stored with a computer program, and the processor is configured to execute the computer program to cause the electronic device to perform the method for the adaptive repair of the freeform surface.

A computer-readable storage medium is stored with a computer program. The computer program is executed by a processor to implement the method for the adaptive repair of the freeform surface Technical effects achieved by embodiments of the disclosure may be as follows.

The disclosure solves a problem of insufficient repair quality and efficiency in a traditional planar slicing method for freeform surface repair scenarios. By decomposing the worn body to be repaired into the worn model bottom surface and the standard model top surface, the disclosure ensures sufficient fusion between a laser cladding layer and the worn body bottom surface, and ensures continuity and forming accuracy of the laser cladding layer. Using the worn model bottom surface and the standard model top surface as initial reference surfaces, a normal vector distribution of a freeform surface point cloud is calculated point by point to establish tangent sphere models with a given layer thickness. Then the envelope surface of the tangent sphere models is obtained to achieve the generation of a normal equidistant curved surface. A method for generating the normal equidistant curved surface is repeatedly iterated to perform adaptive surface slicing on the worn body to be repaired layer by layer. Furthermore, to ensure uniformity of a thickness of the laser cladding layer and a final forming accuracy, and considering that a fixed pitch trajectory filling method in the related art results in uneven thickness in regions with different curvatures, the curvature distribution of the freeform surface slice is calculated to establish the curvature-overlapping pitch optimization model. By dynamically optimizing the overlapping pitch, the neighboring overlapping trajectory for the initial scanning trajectory is obtained. Repeatedly iterating the above method enables the growth of the scanning trajectories of the freeform surface slice from center towards both sides, ultimately completing a full filling of the scanning trajectories for the freeform surface slice. In addition, according to the requirements of a robot laser cladding process, the freeform surface scanning trajectories are topologically sorted, and the safety points are inserted between the different ones of the freeform surface scanning trajectories. The processed discrete trajectory points are then fitted with the NURBS curve, which drive the robot to perform layered laser cladding deposition on the freeform surface of the worn body to be repaired, thereby completing the adaptive repair of freeform surface wear.

This disclosure achieves a smooth transition from the worn model bottom surface to a target repair surface by decomposing the worn body and performing normal equidistant freeform surface slicing based on decomposition results. It ensures sufficient fusion between the cladding layer and the worn model bottom surface while maximizing the continuity of the cladding layer. This method eliminates a severe "staircase effect" associated with a traditional slicing method, thereby guaranteeing the processing quality and efficiency of robotic laser repair. Furthermore, to solve the problem of uneven repair layer thickness in the parts with different curvatures due to traditional equidistant overlapping trajectories, the disclosure proposes an overlapping pitch optimization method based on an equal-volume model. By dynamically optimizing the overlapping pitch to adapt to curvature changes of the freeform surface, the method maximizes the uniformity of the thickness of the cladding layer, further ensuring the processing accuracy of the laser-repaired surface.

BRIEF DESCRIPTION OF DRAWINGS

In order to more clearly illustrate the technical solutions in the embodiments of the disclosure or in the related art, the attached drawings used in the embodiments will be briefly introduced below. It is apparent that the attached drawings described below are merely some embodiments of the disclosure, and for those skilled in the art, other attached drawings can also be obtained based on these attached drawings without making inventive efforts.

The attached drawings, which form a part of the disclosure, are provided to further illustrate the disclosure. The illustrative embodiments and their descriptions are intended to explain the disclosure and should not be construed as unduly limiting the scope of the disclosure.

FIG. 4A illustrates a schematic diagram of overlapping effect on a planar surface according to one of the embodiments of the disclosure, FIG. 4B illustrates a schematic diagram of overlapping effect on a concave surface according to another of the embodiments of the disclosure, and FIG. 4C illustrates a schematic diagram of overlapping effect on a convex surface according to still another of the embodiments of the disclosure.

FIG. 5A illustrates a schematic diagram for acquiring an initial scanning trajectory according to the embodiment of the disclosure, FIG. 5B illustrates a schematic diagram of generating trajectory points of overlapping pitch optimization according to the embodiment of the disclosure, FIG. 5C illustrates a schematic diagram of generating neighboring scanning trajectories according to the embodiment of the disclosure, and FIG. 5D illustrates a schematic diagram of filling a freeform surface according to the embodiment of the disclosure.

FIG. 8A illustrates a schematic diagram of curvature calculation according to the embodiment of the disclosure, FIG. 8B illustrates a schematic diagram of generating a trajectory point of overlapping pitch optimization according to the embodiment of the disclosure, and FIG. 8C illustrates a schematic diagram of generation of the neighboring scanning trajectory according to the embodiment of the disclosure.

FIG. 9A illustrates a schematic diagram of a trajectory filling result of a curved surface slice 1 according to the embodiment of the disclosure, FIG. 9B illustrates a schematic diagram of a trajectory filling result of a curved surface slice 2 according to the embodiment of the disclosure, FIG. 9C illustrates a schematic diagram of a trajectory filling result of a curved surface slice 3 according to the embodiment of the disclosure, FIG. 9D illustrates a schematic diagram of a trajectory filling result of a curved surface slice 4 according to the embodiment of the disclosure, FIG. 9E illustrates a schematic diagram of a trajectory filling result of a curved surface slice 5 according to the embodiment of the disclosure, and FIG. 9F illustrates a schematic diagram of a trajectory filling result of a curved surface slice 6 according to the embodiment of the disclosure.

FIG. 10A illustrates a schematic diagram of a result of the robot instruction positions and robot feedback positions for a cladding layer 1 according to the embodiment of the disclosure, FIG. 10B illustrates a schematic diagram of a result of the robot instruction positions and robot feedback positions for a cladding layer 2 according to the embodiment of the disclosure, FIG. 10C illustrates a schematic diagram of a result of the robot instruction positions and robot feedback positions for a cladding layer 3 according to the embodiment of the disclosure, FIG. 10D illustrates a schematic diagram of a result of the robot instruction positions and robot feedback positions for a cladding layer 4 according to the embodiment of the disclosure, FIG. 10E illustrates a schematic diagram of a result of the robot instruction positions and robot feedback positions for a cladding layer 5 according to the embodiment of the disclosure, and FIG. 10F illustrates a schematic diagram of a result of the robot instruction positions and robot feedback positions for a cladding layer 6 according to the embodiment of the disclosure.

DETAILED DESCRIPTION OF EMBODIMENTS

Figure 1:
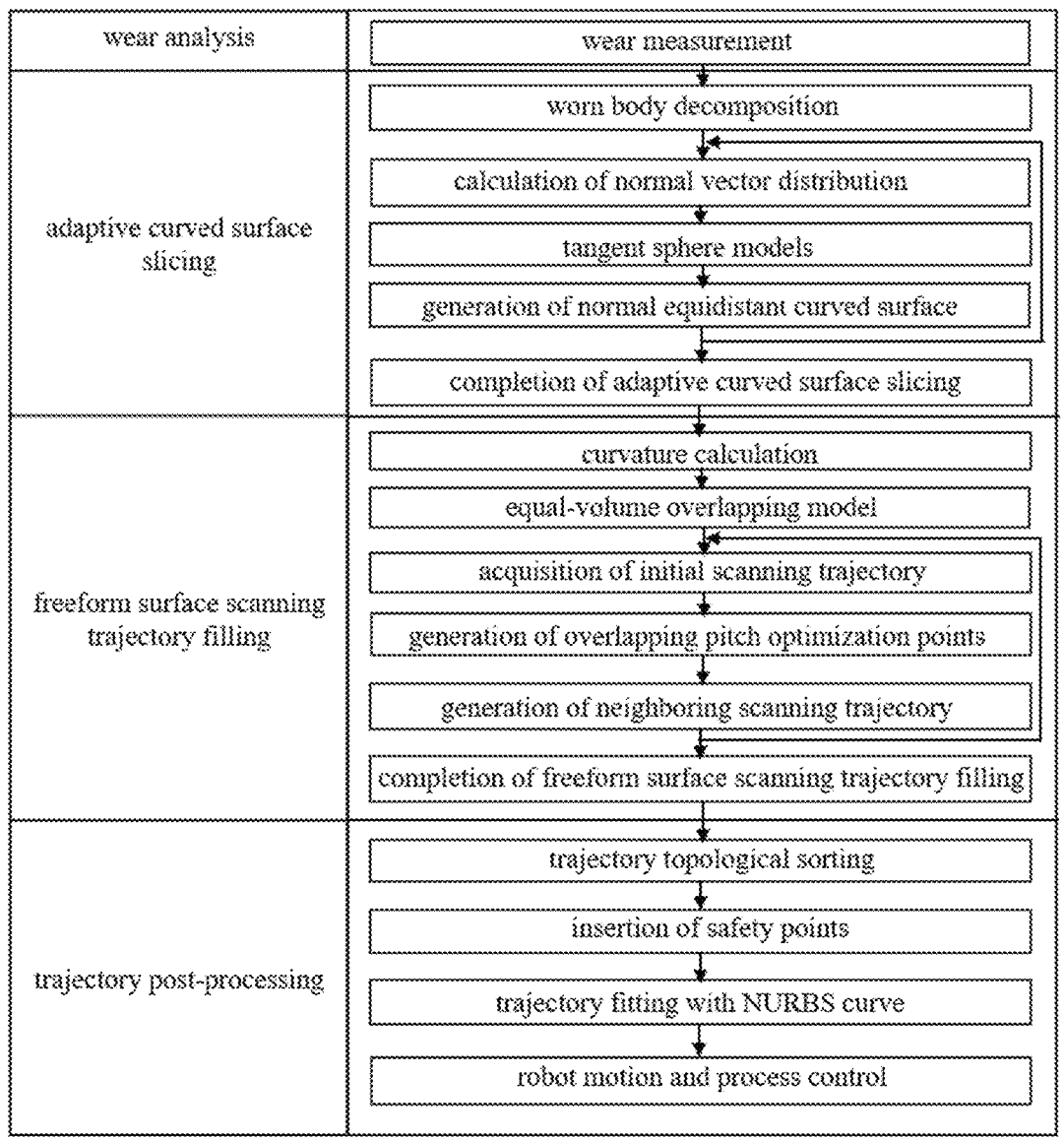
FIG. 1 illustrates a schematic flowchart of an adaptive repair process according to an embodiment of the disclosure.

Various illustrative embodiments of the disclosure are now described in detail. This detailed description should not be construed as limiting the disclosure, but rather as a more detailed description of certain aspects, features, and embodiments of the disclosure.

It should be understood that the terms used in the disclosure should be understood as being employed to describe particular embodiments and not as limiting the disclosure. In addition, with respect to the numerical range disclosed in the disclosure, it should be understood that each intermediate value between the upper and lower limits of the range is also explicitly disclosed. Any intermediate value within any stated value or range, as well as any smaller range between any other stated value or intermediate values within the range, are also included in the invention. The upper and lower limits of these smaller ranges may be independently included or excluded.

Unless otherwise specified, all technical and scientific terms used in this document shall have the same meanings as commonly understood by those skilled in the art to which the disclosure belongs. Although only the specific methods are described in the disclosure, any methods similar to or equivalent to those described in this document may also be used in the implementation or testing of the disclosure. All documents referred to in this specification are incorporated by reference to disclose and describe methods related to the cited documents. In the event of any conflict between any incorporated documents and this specification, the content of this specification shall prevail.

Without departing from the scope or spirit of the disclosure, various improvements and modifications to the specific embodiments described in the specification of the disclosure are apparent to those skilled in the art. Other embodiments that can be derived from the specification of the disclosure are also obvious to those skilled in the art. The specification and embodiments of the disclosure are merely illustrative.

The terms "comprise", "include", "have", "contain" and the like used in this text are all open-ended terms, meaning that they include but are not limited to.

It should be noted that the embodiments and features within the embodiments in the disclosure can be combined with each other without conflict. The following detailed description of the disclosure will be provided with reference to the attached drawings and in conjunction with the embodiments.

Embodiment 1

As shown in FIGS. 1-11, an embodiment of the disclosure provides a method for adaptive repair of a freeform surface. A worn workpiece is subjected to data discretization to obtain a worn body to be repaired. The worn body to be repaired is adaptively segmented to obtain initial reference surfaces, and the initial reference surfaces include a worn model bottom surface and a standard model top surface. Based on each of the initial reference surfaces, a freeform surface slice is constructed. Surface curvature distribution data of the freeform surface slice are calculated, and a curvature-overlapping pitch optimization model is constructed to perform adaptive trajectory filling on the freeform surface slice to thereby obtain freeform surface scanning trajectories. Scanning trajectory points of the freeform surface scanning trajectories are topologically sorted to obtain processing trajectories. The processing trajectories are fitted, and then adaptive repair on the freeform surface is performed.

In response to a problem of insufficient processing quality and efficiency in repairing the freeform surface using a traditional planar slicing method, the embodiment decomposes the worn body to be repaired into the worn model bottom surface and the standard model top surface through curved surface decomposition. To ensure sufficient fusion of a laser cladding layer with a bottom surface of the worn body and to ensure continuity and forming accuracy of the cladding layer, a method for generating a normal equidistant surface based on a three-dimensional point cloud, using the worn model bottom surface and the standard model top surface as the initial reference surfaces. By calculating a normal vector distribution of each freeform surface point cloud surface point by point, tangent sphere models with a given layer thickness are established, and an envelope surface of the tangent spheres is obtained to achieve the generation of the normal equidistant surface. By iteratively applying the method for generating the normal equidistant surface, a target body (i.e., the worn body) to be repaired is subjected to adaptive curved surface slicing on a layer-by-layer basis. Furthermore, to ensure uniform thickness of the cladding layer and final forming accuracy, considering that a traditional fixed pitch trajectory filling method has a problem of non-uniform thickness in different curvature parts, an overlapping pitch optimization method for freeform surface trajectory generation is provided. By calculating the surface curvature distribution of the freeform surface slice, establishing the curvature-overlapping pitch optimization model, and dynamically optimizing an overlapping pitch, a neighboring overlapping trajectory of an initial scanning trajectory is obtained. Through iterative application of this method, scanning trajectories of the freeform surface slice grow from center to two sides respectively, ultimately performing a full filling of the scanning trajectories of the freeform surface slice. In addition, in accordance with the requirements of a robot laser cladding process, generated freeform surface scanning trajectories are topologically sorted. Safety points are inserted between different ones of the freeform surface scanning trajectories, and discrete trajectory points after processing are fitted with a NURBS curve. This process drives the robot to perform layered laser cladding deposition on the freeform surface of the target worn body, thereby performing adaptive repair on freeform surface wear.

Step 1, by conducting reverse modeling of a worn part and subsequently performing wear analysis, the worn body to be repaired is obtained.

Step 2, the worn body to be repaired is decomposed into the worn model bottom surface and the standard model top surface. Based on discrete point cloud data, normal vector distributions of the worn model bottom surface and the standard model top surface are calculated respectively. By establishing tangent sphere models respectively, a normal equidistant curved surface is obtained. Subsequently, using the generated equidistant curved surface as a reference, the above method is iteratively applied to achieve the adaptive curved surface slicing of the worn body from outside to inside on the layer-by-layer basis.

Step 3, based on the freeform surface slice of the worn body, the surface curvature distribution data of the freeform slice surface are calculated. The curvature-overlapping pitch optimization model is established according to an equal-volume overlapping model. Subsequently, taking the initial scanning trajectory as a reference, overlapping pitch optimization points of respective points on the initial scanning trajectory are iteratively calculated to generate a neighboring scanning trajectory. Furthermore, using the generated neighboring scanning trajectory as a reference, the above method is repeatedly iterated to facilitate the growth of the scanning trajectories from the center to a periphery of the freeform surface slice, ultimately performing adaptive filling on the freeform surface slice with overlapping optimization.

Step 4, In accordance with the processing requirements, generated freeform surface filling trajectories are topologically sorted to obtain sorted processing trajectories. Subsequently, using discrete points on the sorted processing trajectories as working points, the safety points are inserted between the different ones of the freeform surface scanning trajectories. The processing trajectories are then fitted with the NURBS curve. Concurrently, based on different types of the working points and the safety points on the processing trajectories, a working state of the laser is synchronously triggered to achieve coordinated control between robot motion and laser repair processing.

The embodiment also provides a system for implementing the method for the adaptive repair of the freeform surface. The system includes a wear analysis module, an adaptive curved surface slicing module, a freeform surface scanning trajectory filling module, and a trajectory post-processing module. The wear analysis module is configured to measure the wear of a target worn workpiece and generate the worn body to be repaired. The adaptive curved surface slicing module is configured to decompose the worn body to be repaired, calculate the normal vector distributions of each of decomposed surfaces (i.e., the initial reference surfaces), and generate the normal equidistant surface by establishing the tangent sphere models, ultimately performing the adaptive surface slicing on the worn body to be repaired through iteration. The freeform surface scanning trajectory filling module is configured to calculate the surface curvature data of the freeform surface slice, establish an equal-volume curvature-overlapping model, iterate on the initial scanning trajectory to obtain the overlapping pitch optimization points for the points of the initial scanning trajectory, and generate the neighboring overlapping trajectory, ultimately performing the filling of the freeform surface scanning trajectories through iteration. The trajectory post-processing module is configured to perform the topological sorting on the freeform surface scanning trajectories, use the discrete points on the sorted scanning trajectories as the working points, insert the safety points between the different ones of the freeform surface scanning trajectories, fit final trajectories (i.e., the processing trajectories) with a NURBS curve, and control the robot motion and process control to perform adaptive repair processing of the freeform surface wear.

It should be noted that, in some embodiments, each of the wear analysis module, the adaptive curved surface slicing module, the freeform surface scanning trajectory filling module and the trajectory post-processing module is embodied by at least one processor and at least one memory coupled to the at least one processor, and the at least one memory stores computer programs executable by the at least one processor.

The embodiment of the disclosure solves a problem of poor repair quality and low efficiency caused by a "staircase effect" of the traditional planar slicing method in the scenario of freeform surface wear repair. It also solves a problem of poor adaptability to curved surfaces and uneven repair layer thickness in parts with different curvatures, which are associated with traditional equidistant overlapping trajectories. By achieving the adaptive repair on the freeform surface wear, the surface quality and processing efficiency of the repair process are improved.

Compared to the related art, the embodiment of the disclosure decomposes the worn body and performs normal equidistant freeform surface slicing based on decomposition results. This achieves a smooth transition from a worn base to a target repair surface, ensuring sufficient fusion between a cladding layer and a worn base surface. It also maximizes the continuity of the cladding layer, eliminating the severe "staircase effect" associated with the traditional slicing method, thereby ensuring the processing quality and efficiency of robotic laser repair. In addition, to solve the problem of non-uniform repair layer thickness in the parts with different curvatures, which is a problem with the traditional equidistant overlapping trajectories, an overlapping pitch optimization method based on the equal-volume model is proposed. By dynamically optimizing overlapping pitches to accommodate the curvature changes of the freeform surface, this method ensures the uniformity of the cladding layer thickness, further ensuring the processing accuracy of the laser repair surface.

In response to the challenges of adaptive surface slicing and spatial trajectory planning in the context of freeform surface repair, an adaptive surface slicing and trajectory planning method for robotic laser repair of the freeform surface is proposed, as shown in FIG. 1. Initially, the wear of the freeform surface workpiece is measured and analyzed to obtain precise quantification and localization data of the workpiece wear. Subsequently, the worn body to be repaired is decomposed into the worn model bottom surface and the standard model top surface. To ensure sufficient fusion between the laser cladding layer and the worn base surface, as well as to ensure the continuity and forming accuracy of the cladding layer, a method for generating the normal equidistant curved surface based on the three-dimensional point cloud is proposed. This method calculates the normal vector distribution for each point in the freeform surface point cloud surface, establishes the tangent sphere models with a given layer thickness, and subsequently obtains the envelope surface of the tangent sphere models to achieve the generation of the normal equidistant curved surface. The method of generating the normal equidistant curved surface is iteratively applied to perform adaptive surface slicing on the target body to be repaired on the layer-by-layer basis. Further, to ensure the uniformity of the cladding layer thickness and the final forming accuracy, considering that the traditional fixed pitch trajectory filling method has the problem of non-uniform thickness in different curvature parts, a method for generating freeform surface trajectories with overlapping optimization pitches is proposed. This method calculates the surface curvature distribution of the freeform surface slice, establishes the curvature-overlapping pitch optimization model, and dynamically optimizes the overlapping pitch to obtain the neighboring overlapping trajectory for the initial scanning trajectory. By iteratively applying the above method, the trajectories of the freeform surface slice grow from the center to the sides, ultimately achieving complete filling of the scanning trajectories for the freeform surface slice. Further, in accordance with the requirements of the robotic laser cladding process, the generated freeform surface scanning trajectories are topologically sorted. The safety points are inserted between the different ones of the freeform surface scanning trajectories. The discrete trajectory points, after processing, are fitted with the NURBS curve. This process drives the robot to perform layered laser cladding deposition on the target freeform surface worn body, thereby completing the adaptive repair of the freeform surface wear.

Specific steps of the wear analysis mentioned in the step 1 are as follows. With a given precision $\delta_{error}$, an actual worn workpiece model and an original standard workpiece model are subjected to the data discretization respectively to obtain dense point cloud models. Subsequently, difference values between the actual worn workpiece model and the original standard workpiece model are calculated through point-by-point iteration, with a difference value d representing a wear amount. By iteratively calculating wear amounts for all points on the actual worn workpiece model, specific information on error quantification and localization can be obtained, providing the worn body D to be repaired for subsequent repair trajectory planning.

Figure 2:
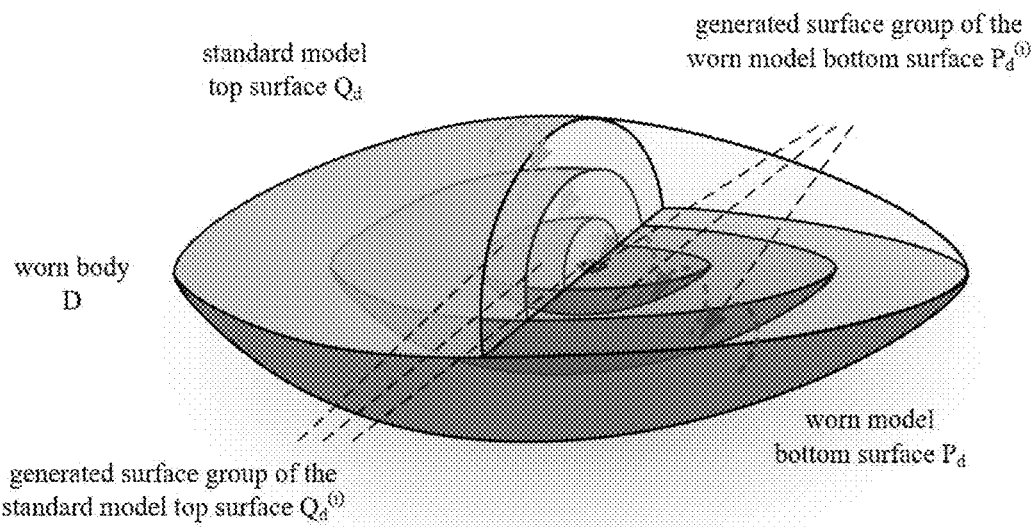
FIG. 2 illustrates a schematic diagram of an adaptive curved surface slicing strategy for a worn body according to an embodiment of the disclosure.

Specific steps of the adaptive curved surface slicing mentioned in the step 2 are as follows. Based on the worn body D to be repaired obtained from the step 1, as shown in FIG. 2, according to distance relationships of discrete points on the worn body D to be repaired to surfaces of the actual worn workpiece model and the original standard workpiece model, the worn body D to be repaired can be adaptively segmented into two point cloud surfaces: the worn model bottom surface $P_d$ and the standard model top surface $Q_d$.

The generation of the traditional equidistant curved surface usually uses a fixed-direction translation method. However, due to the varying curvature of the freeform surface, this traditional method has a drawback of non-uniform local normal thickness distribution, which significantly impacts processing accuracy of layered cladding. Therefore, the embodiment of the disclosure provides a method for generating the normal equidistant curved surface, which strictly ensures the uniformity of slicing layer pitch. By calculating a local normal vector distribution of the freeform surface, tangent spheres (i.e., the tangent sphere models) of a given thickness are established point by point. The envelope surface of the tangent spheres is fitted to achieve the generation of locally normal equidistant curved surface. This method overcomes the problem of non-uniform thickness associated with the traditional fixed-direction translation method, providing a guarantee for the thickness control of the laser repair layer.

The worn model bottom surface $P_d$ and the standard model top surface $Q_d$, obtained from the above model decomposition, are used as the reference surfaces, and $R_{neighbor}$ is used as a neighboring radius to select a set of neighboring points $\{N_i\}$ for a current reference point $p_i$. A covariance matrix $E(N_i)$ of the set of the neighboring points $\{N_i\}$ is calculated according to a formula as follows:

$$E(N_i) = \begin{bmatrix} \text{cov}(x,x) & \text{cov}(x,y) & \text{cov}(x,z) \\ \text{cov}(y,x) & \text{cov}(y,y) & \text{cov}(y,z) \\ \text{cov}(z,x) & \text{cov}(z,y) & \text{cov}(z,z) \end{bmatrix}$$

where $p_j = (x_j, y_j, z_j) \in \{N_i\}$, and $$\begin{cases} \text{cov}(x,x) = \frac{\sum_{j=1}^{n}(x_j - \bar{x})*(x_j - \bar{x})}{n-1} \\ \text{cov}(y,y) = \frac{\sum_{j=1}^{n}(y_j - \bar{y})*(y_j - \bar{y})}{n-1} \\ \text{cov}(z,z) = \frac{\sum_{j=1}^{n}(z_j - \bar{z})*(z_j - \bar{z})}{n-1} \\ \text{cov}(x,y) = \text{cov}(y,x) = \frac{\sum_{j=1}^{n}(x_j - \bar{x})*(y_j - \bar{y})}{n-1} \\ \text{cov}(x,z) = \text{cov}(z,x) = \frac{\sum_{j=1}^{n}(x_j - \bar{x})*(z_j - \bar{z})}{n-1} \\ \text{cov}(y,z) = \text{cov}(z,y) = \frac{\sum_{j=1}^{n}(y_j - \bar{y})*(z_j - \bar{z})}{n-1} \end{cases}$$

By performing singular value decomposition (SVD) on the covariance matrix $E(N_i)$, an eigenvector corresponding to a smallest eigenvalue of the covariance matrix $E(N_i)$ is obtained and normalized, which is used as a normal vector $v_i$ at that point (i.e., the current reference point $p_i$). Therefore, the normal vector distribution of each of the reference surfaces is obtained.

Figure 3:
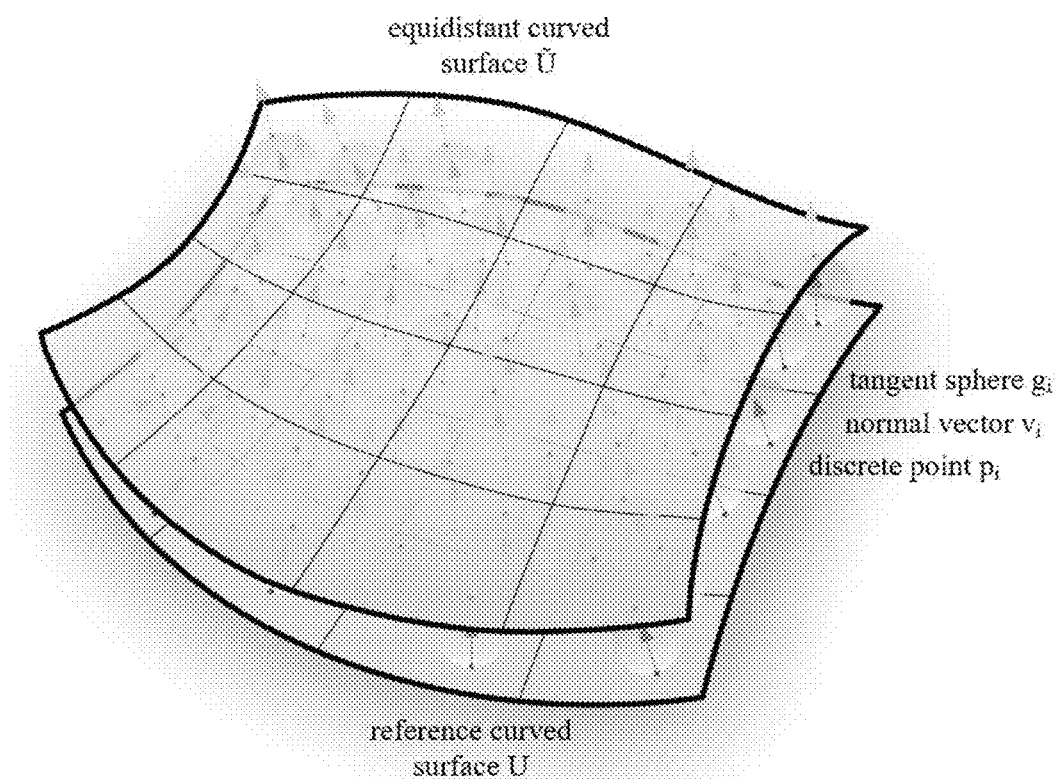
FIG. 3 illustrates a schematic diagram of a method for generating an equidistant curved surface according to an embodiment of the disclosure.
Figure 4A:
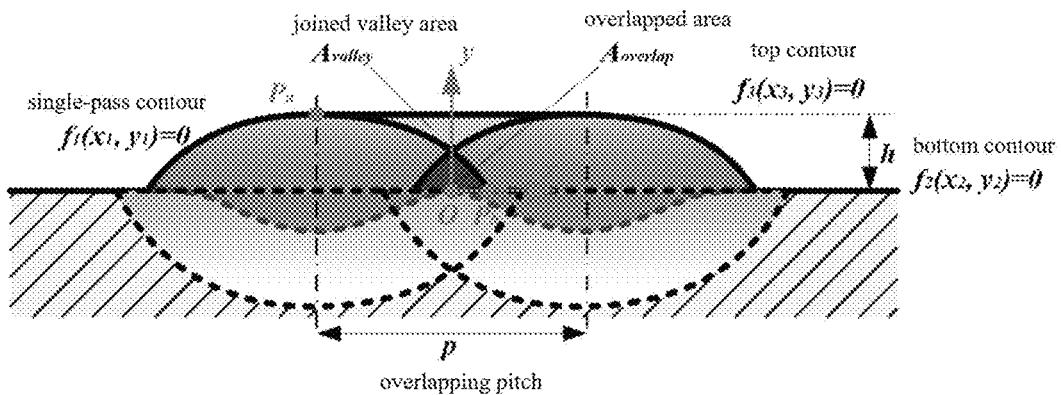
FIGS. 4A-4C illustrate schematic diagrams of overlapping effects at different curvatures according to embodiments of the disclosure. Specifically.
Figure 4B:
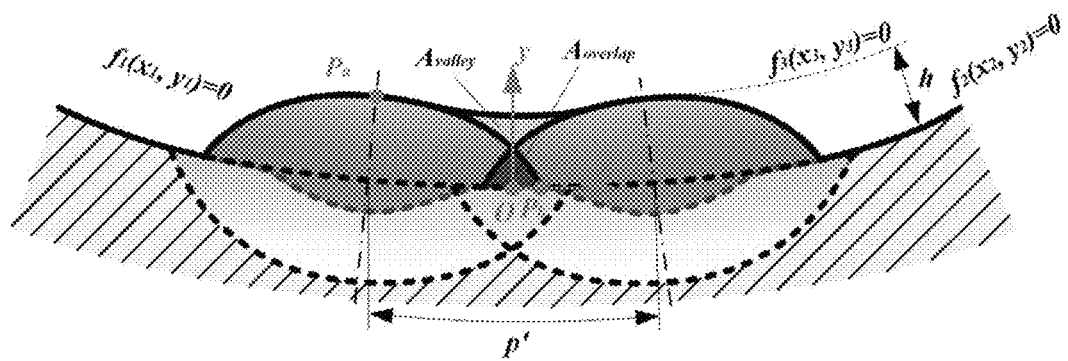
Figure 4C:
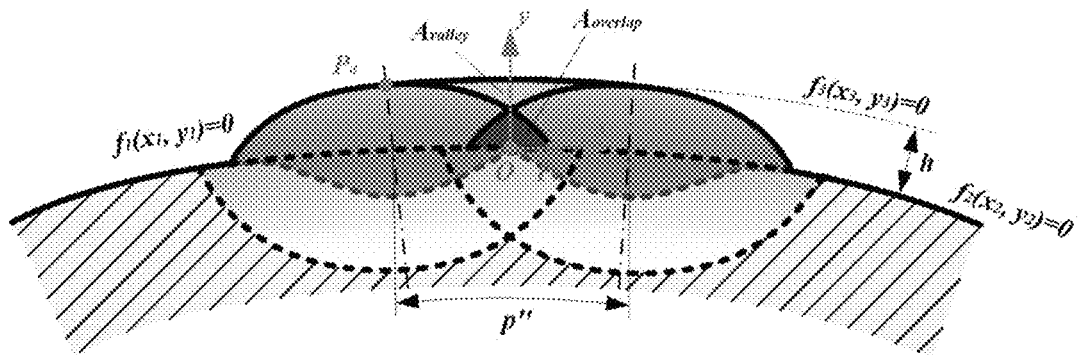

Furthermore, the current discrete point $p_i$ is used as the reference point. Based on the calculated normal vector $v_i$, and with a given cladding thickness h as a diameter, a tangent sphere $g_i$ is constructed for each of the reference surfaces, as shown in FIG. 3. By traversing all discrete points on a reference curved surface U, an envelope surface of the tangent spheres is obtained, which constitutes an equidistant curved surface $\tilde{U}$ of the given thickness.

Furthermore, the worn model bottom surface $P_d$ and the standard model top surface $Q_d$ are used as the reference surfaces, and the aforementioned method for generating the normal equidistant curved surface is iterated. The iteration continues until a maximum distance between an equidistant curved surface of the worn model bottom surface $$P_d^{(n)}$$

and an equidistant curved surface of the standard model top surface $$Q_d^{(n)}$$

is less than the given cladding thickness h. Thus, a generated surface group of the worn model bottom surface $$\{P_d^{(1)}, P_d^{(2)}, P_d^{(3)}, \ldots, P_d^{(n)}\}$$

and a generated surface group of the standard model top surface $$\{Q_d^{(1)}, Q_d^{(2)}, Q_d^{(3)}, \ldots, Q_d^{(n)}\}$$

can be obtained. According to a principle of from outside to inside and from bottom to top, an order of cladding layers is rearranged as a processing strategy for adaptive defect repair of the freeform surface, that is, from $$P_d^{(1)}$$

to $$P_d^{(n)}$$

and then from $$Q_d^{(n)} Q_d^{(1)},$$

as shown in FIG. 2.

Specific steps of the freeform surface scanning trajectory filling mentioned in the step 3 are as follows. Based on the freeform surface slice obtained previously, a quadratic surface fitting method is used to acquire the curvature distribution of the point cloud of the curved surface slice. Similarly, with the current reference point $p_i$ as a center and $R_{neighbor}$ as a neighboring radius, the set of neighboring points $\{N_i\}$ of the current reference point $p_i$ is selected. Subsequently, a least squares method is employed to perform quadratic surface fitting on the current set of neighboring points $\{N_i\}$.

To simplify a calculation process, it can be assumed that a parametric equation of the fitted quadratic surface is:

$$r(x,y) = \begin{cases} X(x,y) = x \\ Y(x,y) = y \\ Z(x,y) = ax^2 + bxy + cy^2 \end{cases}$$

Then, a fitting error of the set of neighboring points $\{N_i(x_i, y_i, z_i)\}$ can be denoted as:

$$Q_i^2 = \sum_{j=0}^{n}[Z(x_j, y_j) - z_j]^2 = \sum_{j=0}^{n}(ax_j^2 + bx_jy_j + cy_j^2 - z_j)^2$$

where $$p_j = (x_j, y_j, z_j) \in \{N_i\}.$$

A minimum value point of $$Q_i^2$$

is taken, that is, the following system of partial differential equations is calculated:

$$\begin{cases} \dfrac{\partial Q_i^2}{\partial a} = \sum_{j=0}^{n} 2x_j^2(ax_j^2 + bx_jy_j + cy_j^2 - z_j) = 0 \\ \dfrac{\partial Q_i^2}{\partial b} = \sum_{j=0}^{n} 2x_jy_j(ax_j^2 + bx_jy_j + cy_j^2 - z_j) = 0 \\ \dfrac{\partial Q_i^2}{\partial c} = \sum_{j=0}^{n} 2y_j^2(ax_j^2 + bx_jy_j + cy_j^2 - z_j) = 0 \end{cases}$$

Fitted quadratic surface parameters a, b, c for the set of neighboring points $\{N_i\}$ can be obtained.

Subsequently, based on the quadratic surface fitting parameters, a Gaussian curvature at the current point is calculated.

Assume that there exists a curve r on the curved surface, which can be parameterized as:

$$r = r(x(t), y(t))$$

It is known from a formula for the differential of arc length:

$$I = (ds)^2 = (dr)^2 =$$
$$(r_x dx + r_y dy)^2 = E(dx)^2 + 2Fdxdy + G(dy)^2 = r_x^2(dx)^2 + 2r_xr_y dxdy + r_y^2(dy)^2$$

Subsequently, a unit normal vector n of the curve is expressed as:

$$n = \dfrac{r_x \times r_y}{|r_x \times r_y|}$$

Furthermore, by taking a second derivative of the above equation, a formula can be obtained as follows:

$$\begin{cases} II = -dr \cdot dn = L(dx)^2 + 2Mdxdy + N(dy)^2 \\ L = r_{xx} \cdot n \\ M = r_{xy} \cdot n \\ N = r_{yy} \cdot n \end{cases}$$

Furthermore, the Gaussian curvature at the current reference point $p_i$ can be calculated as:

$$k = \dfrac{LN - M^2}{EG - F}$$

By traversing all points on the freeform surface slice, the surface curvature distribution of the freeform surface slice can be obtained.

Since the surface curvature of the freeform surface cladding layer is dynamically changing, and based on an equal volume assumption of laser cladding with multi-pass overlapping, the traditional fixed pitch will cause uneven cladding layer thickness when filling the freeform surface slice. Specifically, the cladding layer thickness on a convex surface tends to be thinner, while that on a concave surface tends to be thicker. To solve the problem of how curvature variation affects the cladding layer thickness during multi-pass filling of the freeform surface, the embodiment of the disclosure provides an overlapping pitch optimization method for filling the freeform surface slice, as shown in FIG. 9. Based on the equal volume assumption of multi-pass overlapping, a model is established between local curvature and overlapping pitch. By dynamically optimizing the overlapping pitch, the volume of multi-pass joined valley and the overlapped volume are kept equal in parts with different curvatures, thereby reducing the waviness of the cladding layer surface.

According to the equivalent volume assumption, when the volume of the multi-pass joined valley is equal to the overlapped volume, the waviness of the cladding layer surface is minimized, that is:

$$\begin{cases} A_{overlap} = 2 \cdot \int_{x_{p_b}}^{0}(y_1 - y_2)dx \\ A_{valley} = 2 \cdot \int_{0}^{x_{p_a}}(y_1 - y_2)dx \\ A_{overlap} \equiv A_{valley} \end{cases}$$

where $P_a$ represents an intersection point between a single-pass cladding contour $f_1(x_1, y_1) = 0$ and a top contour of a multi-pass cladding layer $f_3(x_3, y_3) = 0$, $x_{p_a}$ represents a horizontal coordinate value of the intersection point $P_a$; $P_b$ represents an intersection point between the single-pass cladding contour $f_1(x_1, y_1) = 0$ and a bottom surface contour of the cladding layer $f_2(x_2, y_2) = 0$, $x_{p_b}$ represents a horizontal coordinate value of the intersection point $P_b$; for example, $x_{p_a}$ can be specifically calculated using the following equation:

$$\begin{cases} \text{convex surface: } x_{P_a} = -(\rho - h) \cdot \sin\left(\dfrac{p'}{2\rho}\right) \\ \text{concave surface: } x_{P_a} = -(\rho + h) \cdot \sin\left(\dfrac{p''}{2\rho}\right) \end{cases}$$

where $\rho$ represents a radius of the curvature at the current reference point $p_i$, which is $$\dfrac{1}{k},$$

h represents the thickness or the cladding layer at the current reference point; p' represents an optimized overlapping pitch on the convex surface; and p'' represents an optimized overlapping pitch on the concave surface. Thus, this approach enables adaptive optimization of the overlapping pitch for different curvatures, ensuring that the volume of the multi-pass joined valley is equal to the overlapped volume, thereby reducing the waviness of the cladding layer surface.

Figure 5A:
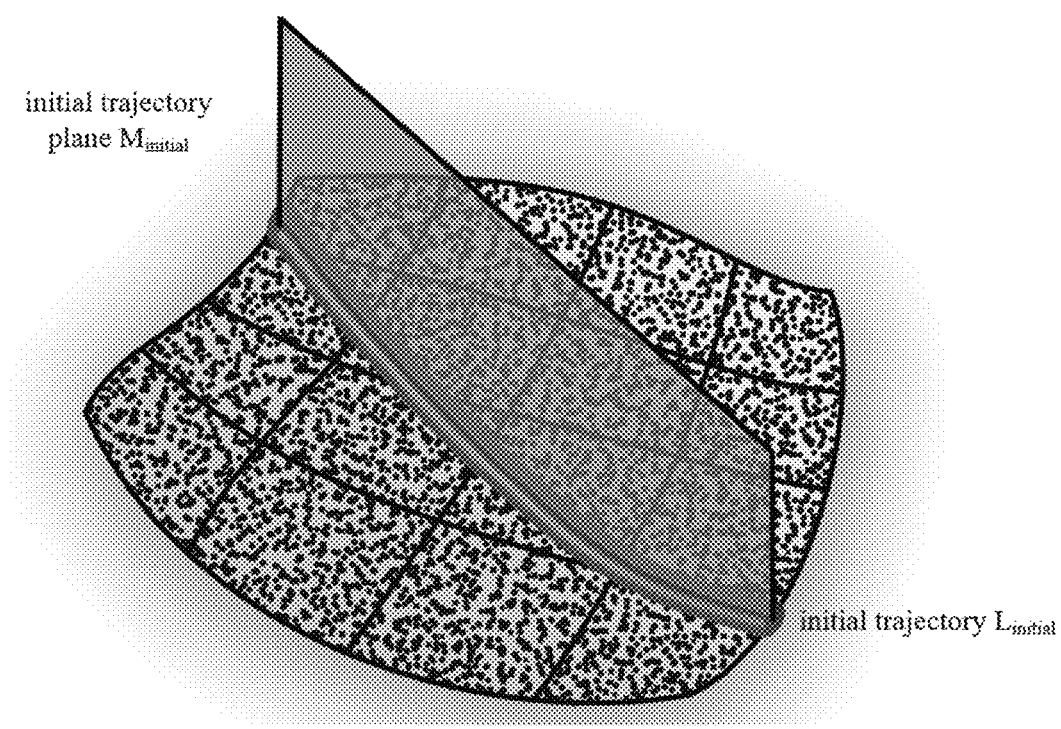
FIGS. 5A-5D illustrate schematic diagrams of a curved surface trajectory filling method with overlapping pitch optimization according to an embodiment of the disclosure. Specifically.

Further, based on the overlapping optimization model, the trajectory filling is performed on the freeform surface slice point cloud. First, according to a given initial trajectory plane $M_{initial}$, a distance from each discrete point $p_i$ on the freeform surface to the initial trajectory plane $M_{initial}$ is iteratively obtained. When the distance is less than the given threshold $\delta_{error}$, the current reference point is saved. After completing the iterative judgment of the discrete points, the initial scanning trajectory $L_{initial}$ can be obtained, as shown in FIG. 5A.

Figure 5B:
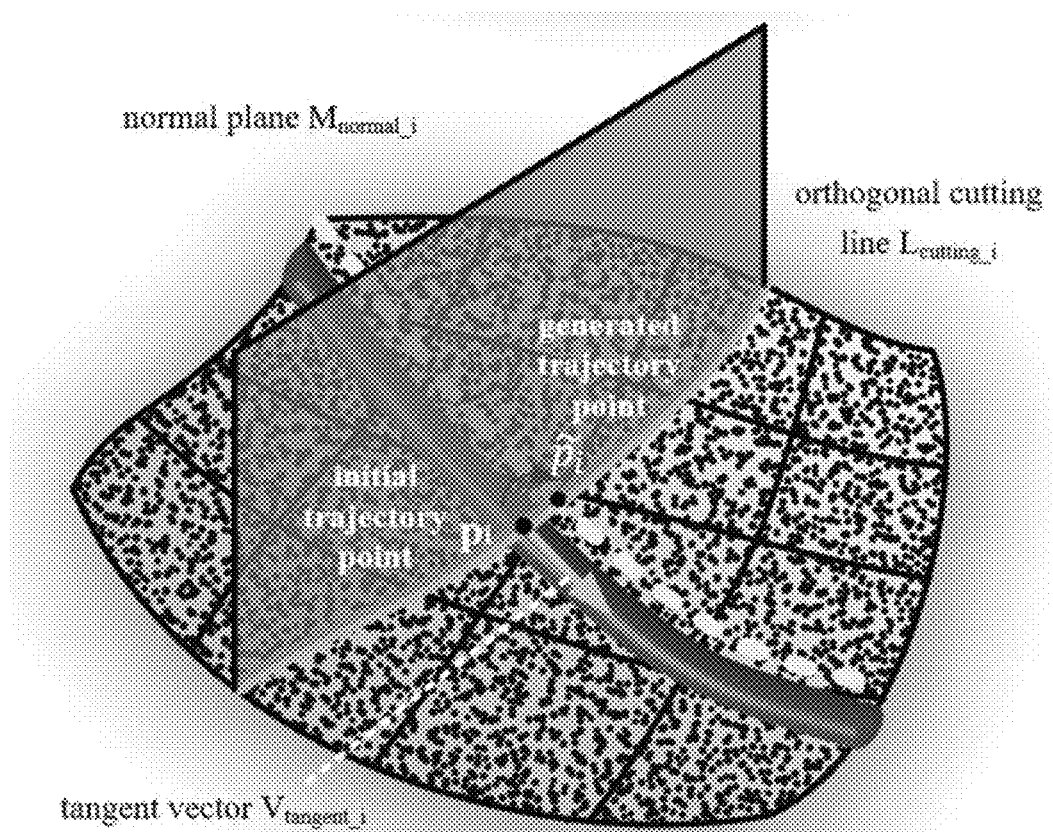

Further, taking the initial scanning trajectory $L_{initial}$ as a reference, a point $p_i$ on the initial scanning trajectory $L_{initial}$ is selected as a reference point. With a tangent vector $V_{tangent\_i}$ at the current reference point $p_i$ as a normal vector, a normal plane $M_{normal\_i}$ is constructed passing through the current reference point $p_i$. A distance of each discrete point on the freeform surface to the normal plane $M_{normal\_i}$ is iteratively calculated again, thereby obtaining an orthogonal cutting line $L_{cutting\_i}$. The arc length distance from each point on the orthogonal cutting line $L_{cutting\_i}$ to the current reference point $p_i$ is iteratively calculated. When the arc length distance is equal to the optimized overlapping pitch, the point is denoted as an overlapping pitch optimization point $\tilde{p}_i$ (i.e., a generated trajectory point), as shown in FIG. 5B. After completing the point-by-point iteration of the initial trajectory $L_{initial}$, the generation of the neighboring overlapping trajectories can be obtained.

Figure 5C:
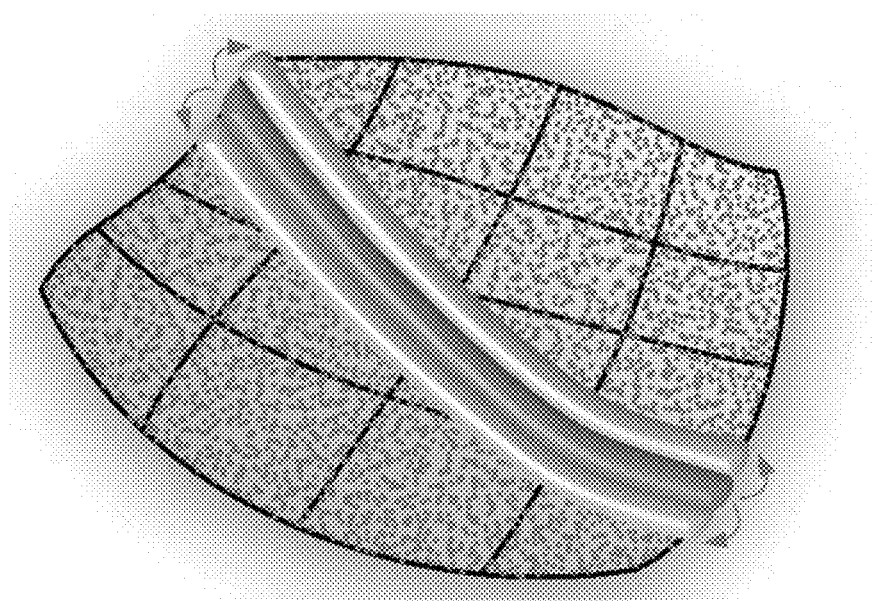
Figure 5D:
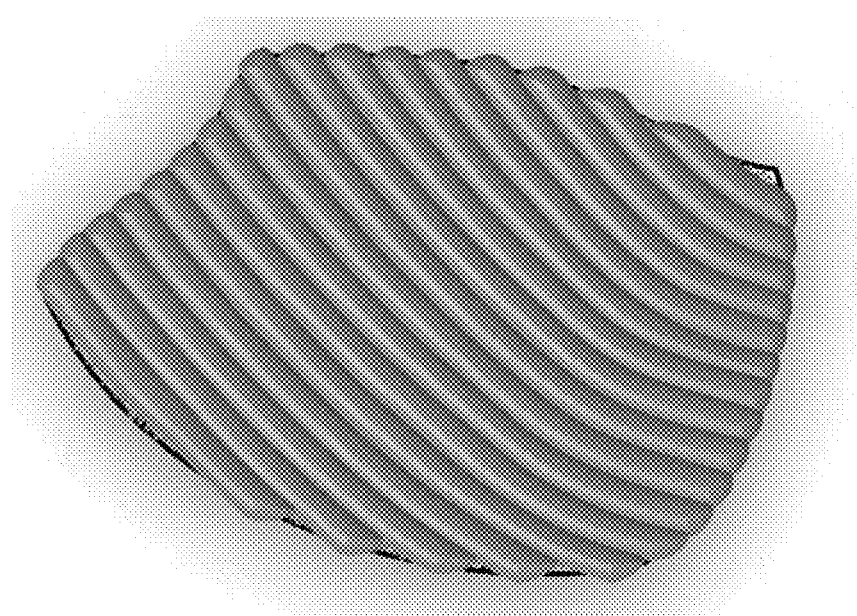

Further, taking the generated neighboring overlapping trajectories as references and repeating the above operations, the scanning trajectories can be progressively filled from the center towards both sides, ultimately completing the filling of the freeform surface, as shown in FIGS. 5C and 5D.

By establishing the equal-volume overlap model and adaptively adjusting the overlapping pitch based on the curvature distribution of the freeform surface slice, the adaptive filling of the freeform surface slicing trajectories is achieved. This overcomes the problem of uneven cladding layer thickness encountered when using traditional fixed pitch to fill the freeform surface slice. It ensures that the volume of the joined valley is equal to the overlapped volume at different curvatures, thereby reducing the waviness of the cladding layer surface.

Specific steps for the trajectory post-processing mentioned in the step 4 are as follows. According to the requirements of robot laser cladding process, the generated scanning trajectories of the freeform surface are topologically sorted to obtain topologically sorted scanning trajectory points. Taking the topologically sorted scanning trajectory points as processing points, the safety points are inserted between the different ones of the freeform surface scanning trajectories. Subsequently, the processing trajectories are fitted using the NURBS curve, ensuring the smoothness and accuracy of the processing trajectories and eliminating processing jitter caused by the original discrete data. Furthermore, based on the different types of processing points and safety points during the processing trajectories, synchronous laser control signals are set to achieve coordinated triggering of laser process parameters during robot motion. This ultimately drives the robot to achieve the target motion and process control, completing the adaptive repair of the freeform surface.

To further illustrate effectiveness and practicality of the embodiment, an application case of the embodiment—repair of a steam turbine guide vane—is experimentally verified. Due to long-term operation in a high-temperature, a high-pressure, and a high-fatigue environment, irregular surface wear and deformation often occur near a trailing edge of a concave surface of the guide vane.

A robotic laser repair experimental platform used in the embodiment consists of a Kawasaki robot, a line laser sensor, a laser, a water chiller, a powder feeder, a laser cladding head, and a coaxial powder feeding cladding nozzle. In addition, by installing a laser tracker target ball on the laser cladding head, position information of the robot is dynamically collected during the actual processing to verify the effectiveness and the practicality of the adaptive surface slicing method and the trajectory planning method provided in the embodiment.

Figure 6:
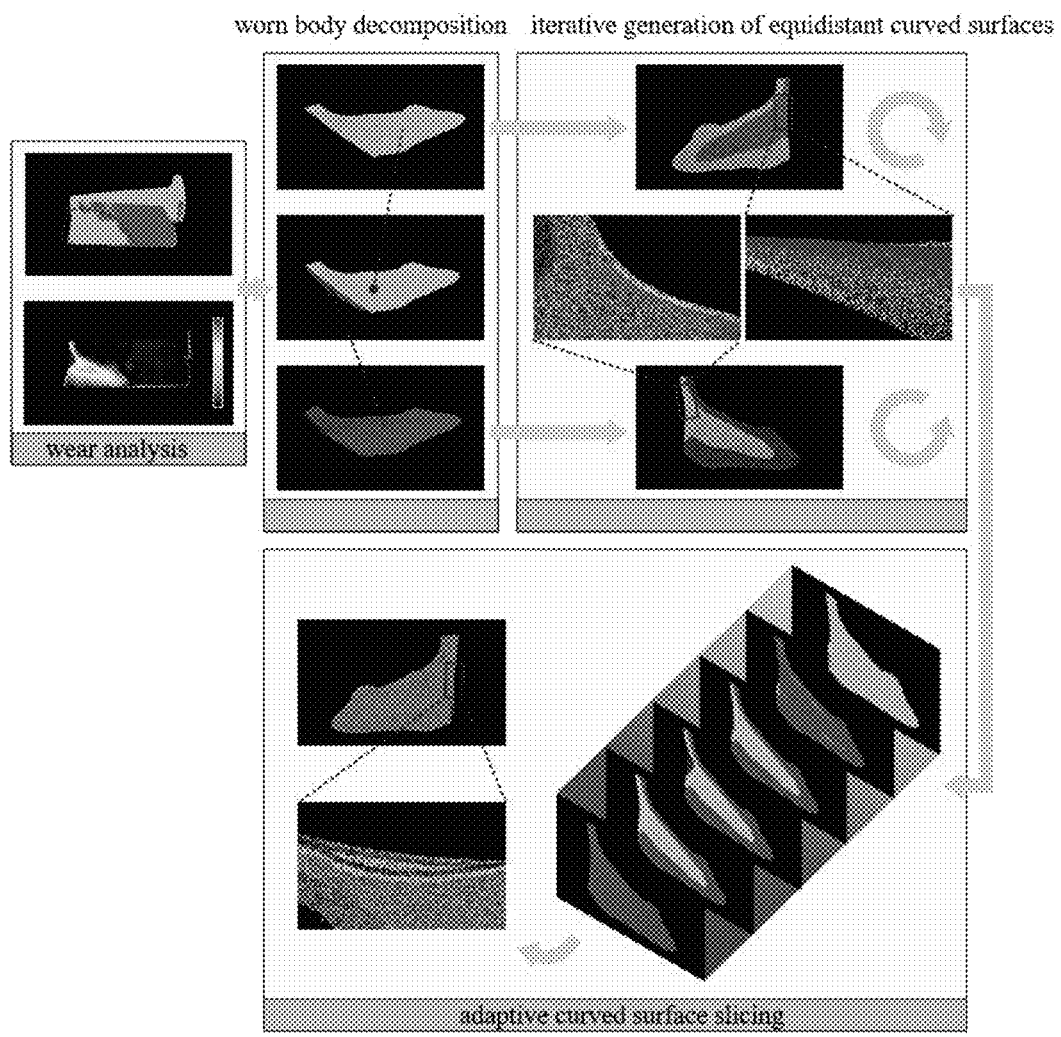
FIG. 6 illustrates a schematic diagram of an adaptive curved surface slicing process of a vane wear body according to an embodiment of the disclosure.
Figure 7:
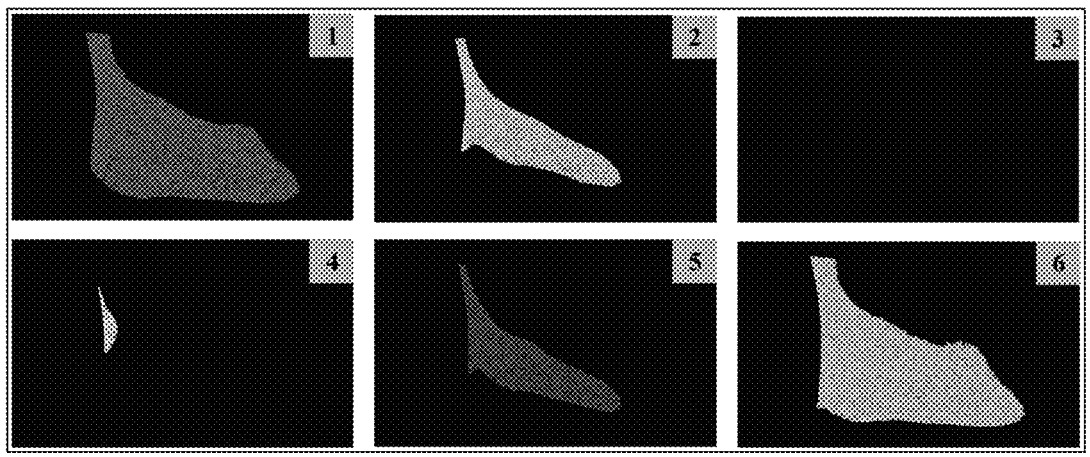
FIG. 7 illustrates a schematic diagram of adaptive curved surface slicing results of the vane wear body according to an embodiment of the disclosure.

FIG. 6 illustrates an adaptive slicing process of a vane wear body. By comparing an actual model of the worn vane collected online by the line laser with an original standard model, a wear condition of the vane is analyzed to obtain a vane wear body to be repaired. Subsequently, the vane wear body is segmented into the worn model surface and the standard model surface. Thereafter, the method described in the embodiment is applied to obtain the normal equidistant curved surface slice. By repeatedly iterating the curved surface slice generation method, adaptive slicing of the vane wear body is achieved, and a final result of six curved surface slices is shown in FIG. 7. An experimental result indicates that the adaptive slicing method for the freeform surface in the embodiment can overcome the severe "staircase effect" and the problem of poor bonding strength at the bottom associated with traditional planar slicing. It achieves conformal cladding for the freeform surface wear, ensuring sufficient fusion between the cladding layer and the base surface. Meanwhile, the adaptive slicing of the freeform surface ensures the continuity of slicing layers, eliminating the severe "staircase effect" of the traditional planar slicing, thereby guaranteeing the quality and efficiency of the repair.

Figure 8A:
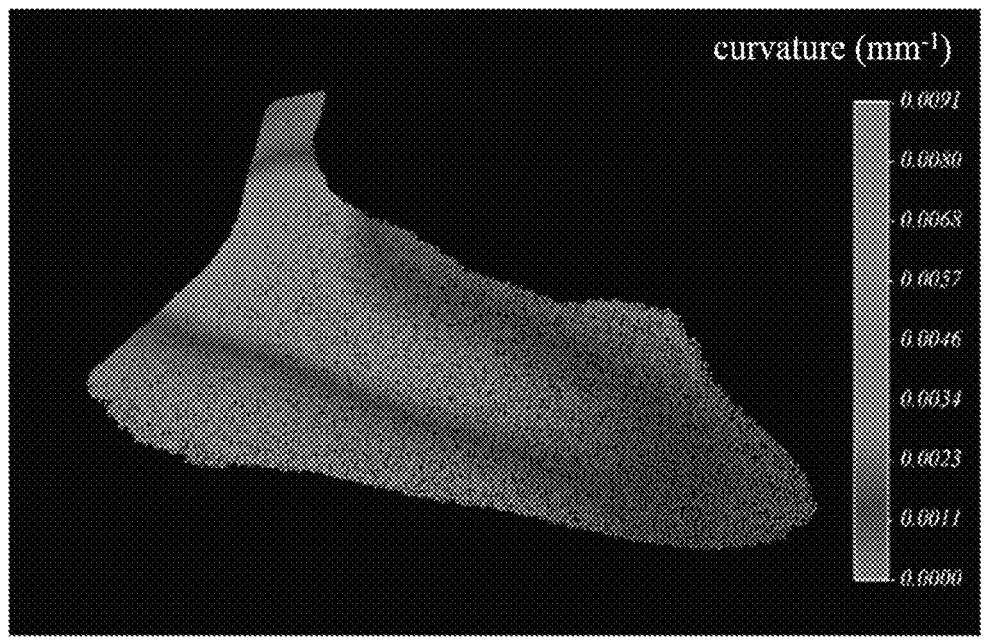
FIGS. 8A-8C illustrate schematic diagrams of a process for generating a neighboring scanning trajectory according to an embodiment of the disclosure. Specifically.
Figure 8B:
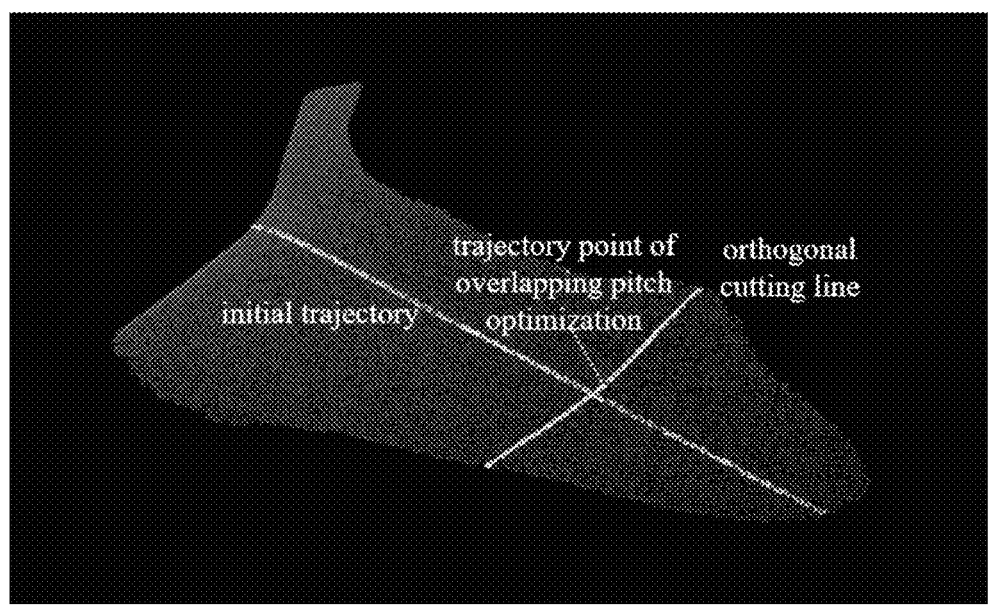
Figure 8C:
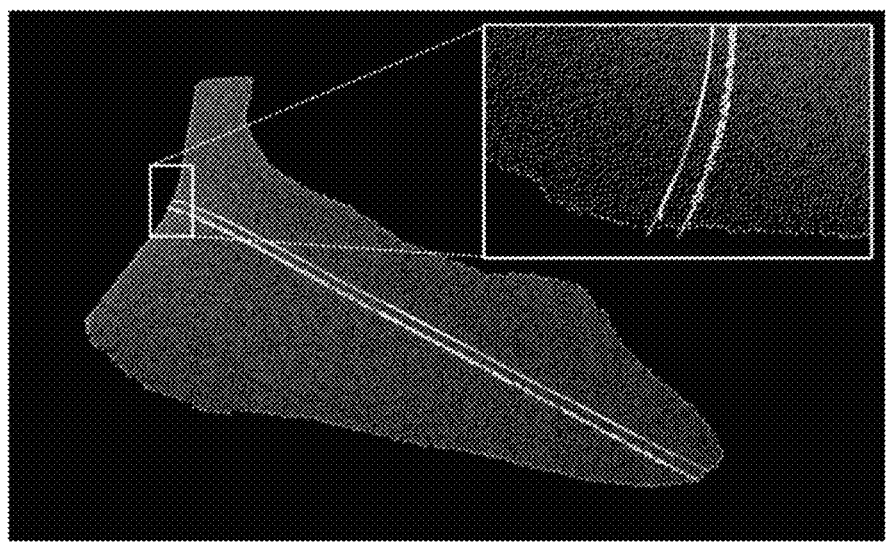
Figure 9A:
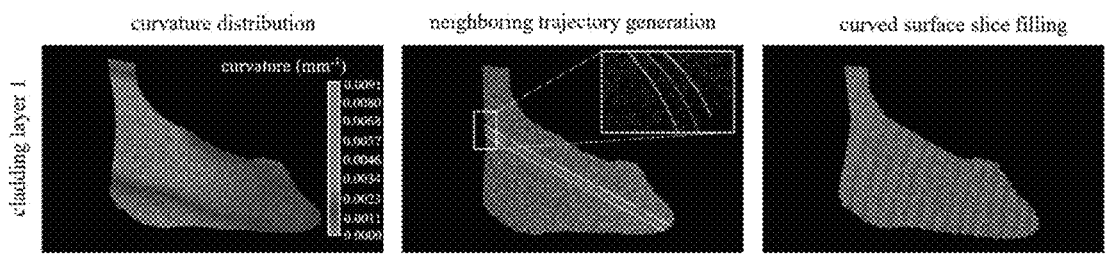
FIGS. 9A-9F illustrate schematic diagrams of trajectory filling results of vane curved surface slices according to an embodiment of the disclosure. Specifically.
Figure 9B:
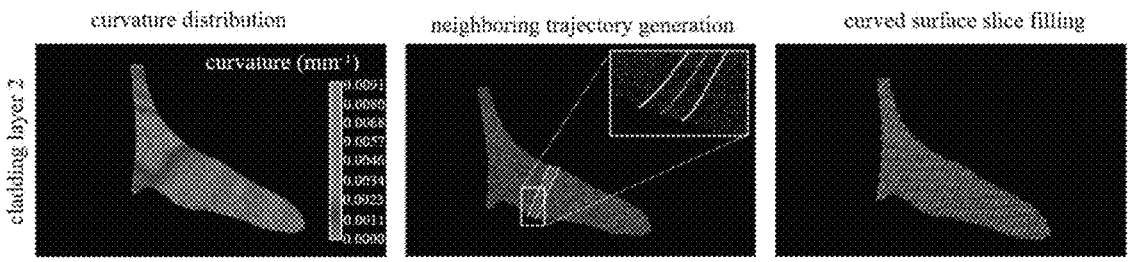
Figure 9C:
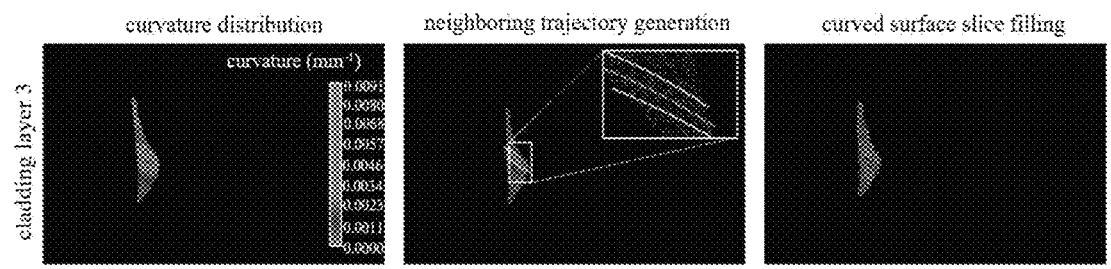
Figure 9D:
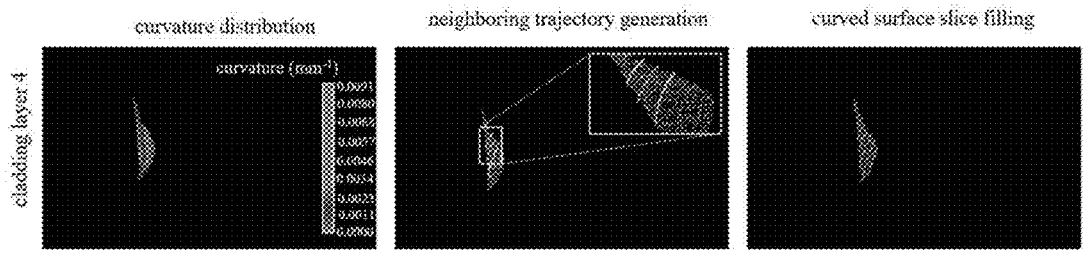
Figure 9E:
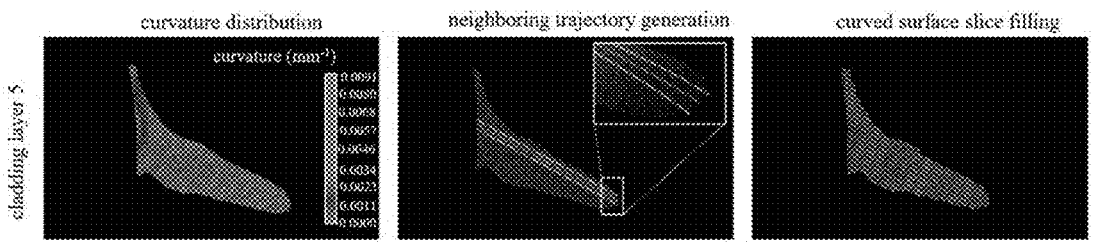
Figure 9F:
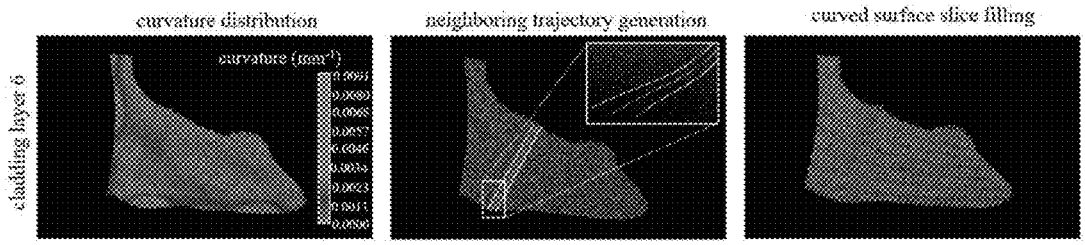
Figure 10A:
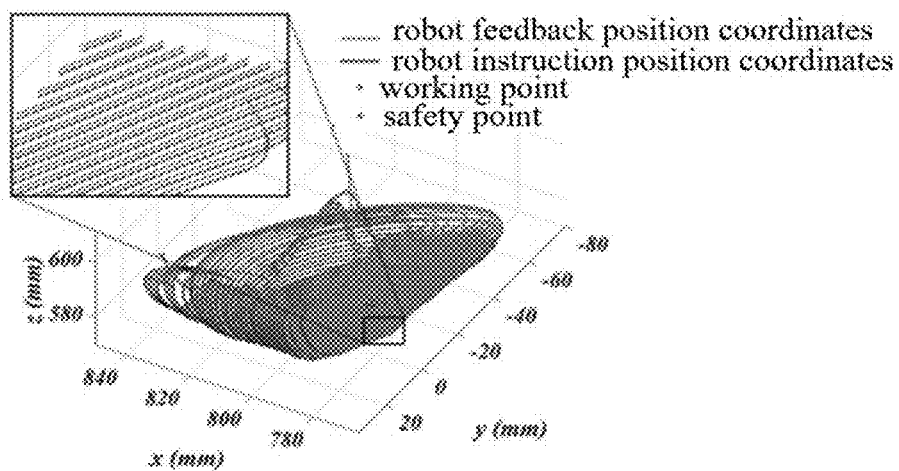
FIGS. 10A-10F illustrate schematic diagrams of results of robot instruction positions and robot feedback positions for a vane repair experiment according to an embodiment of the disclosure. Specifically.
Figure 10B:
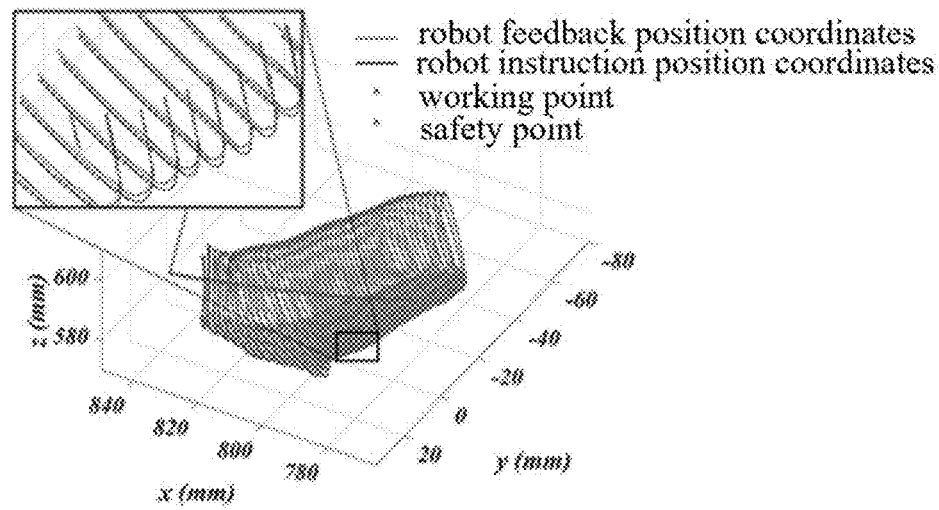
Figure 10C:
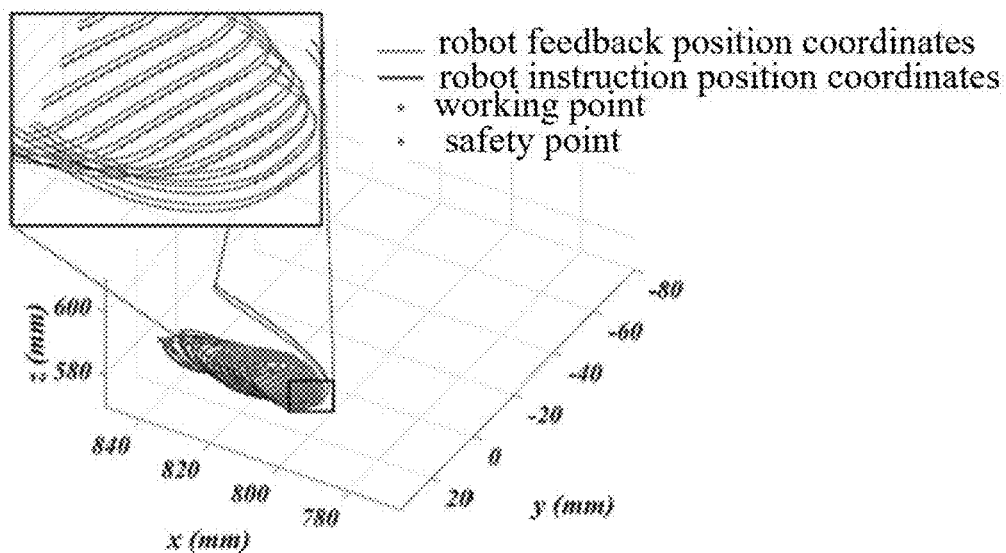
Figure 10D:
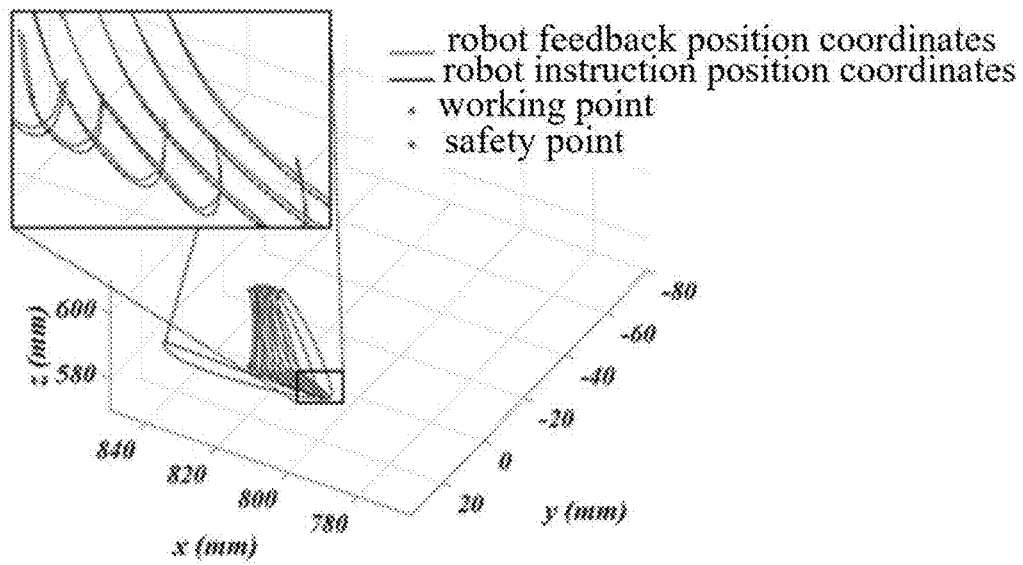
Figure 10E:
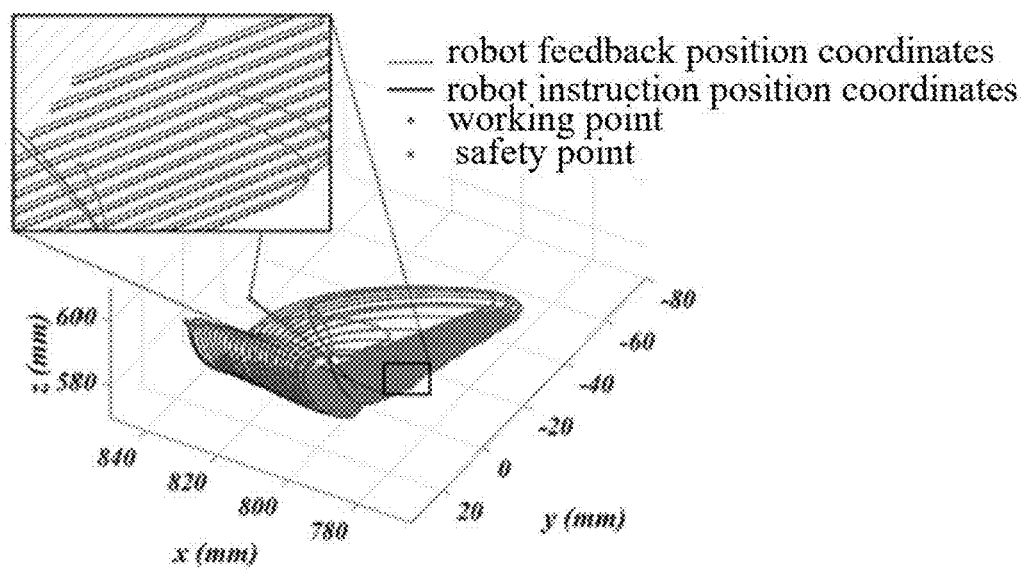
Figure 10F:
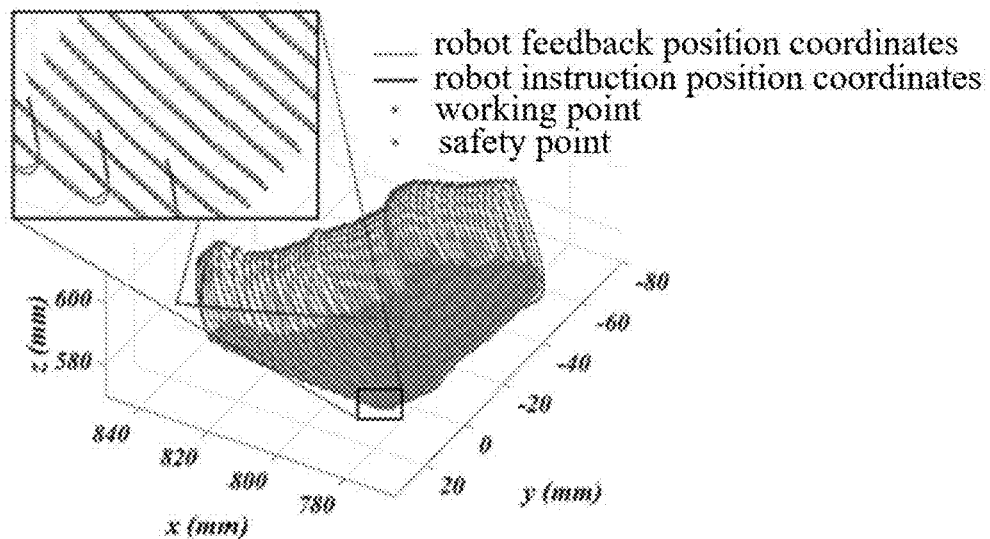

FIGS. 8A-8C are experimental diagrams of the optimized overlapping pitch optimization method for curved surface slice filling during a vane repair process. By establishing the equal-volume overlapping model and based on the curvature distribution of the freeform surface slice, the optimized overlapping points for the current reference trajectory are iteratively calculated point by point to obtain the neighboring overlapping trajectories. Further, taking the generated neighboring overlapping trajectories as references and repeatedly iterating the aforementioned method, the scanning trajectories grow from the center towards both sides, ultimately achieving the overlapping trajectory filling for the six curved surface slices, as shown in FIG. 9. An experimental result indicates that, in the embodiment, the overlapping pitch is dynamically optimized according to the curvature distributions of the vane surface slices, ensuring that the volume of multi-pass valley and the overlapped volume are equal in parts with different curvatures, thereby minimizing the waviness of the vane cladding layer surface to the greatest extent.

Figure 11:
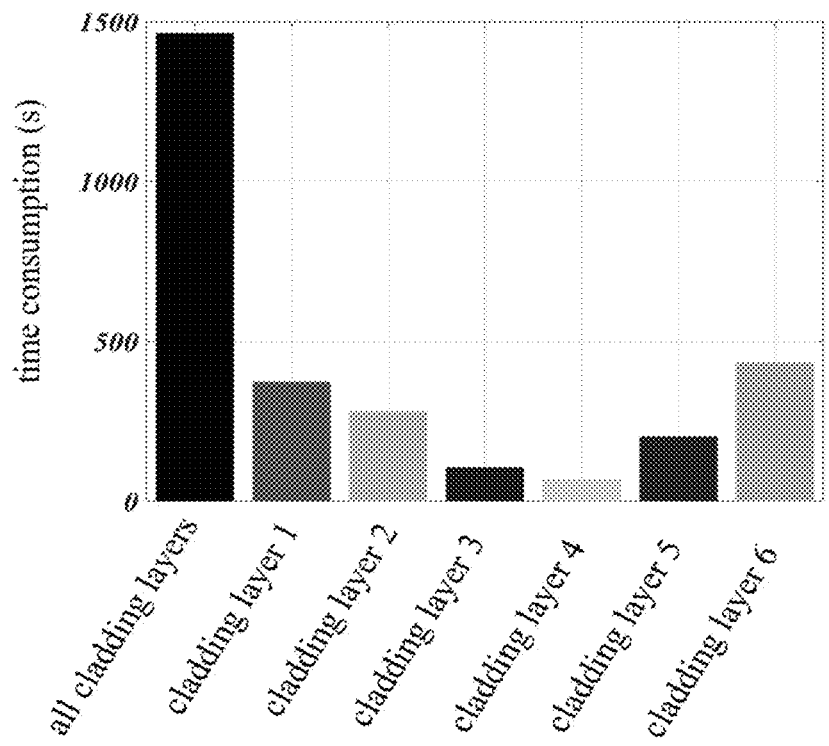
FIG. 11 illustrates a schematic diagram of time consumption results for the vane repair experiment according to an embodiment of the disclosure.

FIGS. 10A-10F illustrate information of robot instruction positions and robot feedback positions collected in a vane cladding process. An experimental result indicates that the adaptive surface slicing method and the trajectory planning method proposed in the disclosure can achieve high-precision conformal repair of the worn surface and impact-free trajectory control. FIG. 11 illustrates time consumption results for each layer of cladding processing. An experimental result demonstrates that the adaptive surface slicing method and the trajectory planning method proposed in the embodiment can ensure the processing accuracy and efficiency of freeform surface repair.

A system for adaptive repair of a freeform surface includes a to-be-repaired body construction module, an adaptive trajectory filling module and a fitting module.

The to-be-repaired body construction module is configured to perform data discretization on a worn workpiece to obtain a worn body to be repaired, and perform adaptive segmentation on the worn body to be repaired to obtain initial reference surfaces. The initial reference surfaces include a worn model bottom surface and a standard model top surface.

The adaptive trajectory filling module is configured to construct a freeform surface slice based on each of the initial reference surfaces, and construct a curvature-overlapping pitch optimization model to perform adaptive trajectory filling on the freeform surface slice to obtain freeform surface scanning trajectories.

The fitting module is configured to perform topological sorting on scanning trajectory points of the freeform surface scanning trajectories to obtain processing trajectories, fit the processing trajectories, and perform adaptive repair on the freeform surface.

It should be noted that, in some embodiments, each of the to-be-repaired body construction module, the adaptive trajectory filling module and the fitting module is embodied by at least one processor and at least one memory coupled to the at least one processor, and the at least one memory stores computer programs executable by the at least one processor.

An electronic device includes a memory and a processor. The memory is stored with a computer program, and the processor is configured to execute the computer program to cause the electronic device to perform the method for the adaptive repair of the freeform surface.

A computer-readable storage medium, which is a non-transitory computer-readable storage medium, is stored with a computer program. The computer program is, when executed by a processor, to implement the method for the adaptive repair of the freeform surface.

The above is only the specific embodiment of the disclosure, but the scope of protection of the disclosure is not limited to this. Any changes or replacements that can be easily conceived by those skilled in the art within the technical scope disclosed in the disclosure should be included in the scope of protection of the disclosure. Therefore, the scope of protection of the disclosure should be based on the scope of protection of the claims.

What is claimed is:

1. A method for adaptive repair of a freeform surface, comprising:
   step 1, performing data discretization on a worn workpiece to obtain a worn body to be repaired, and performing adaptive segmentation on the worn body to be repaired to obtain initial reference surfaces, wherein the initial reference surfaces comprise a worn model bottom surface and a standard model top surface;
   step 2, calculating normal vectors of discrete points on each of the initial reference surfaces, constructing tangent sphere models of the respective discrete points on each of the initial reference surfaces based on the normal vectors, and creating an envelope surface tangent to the tangent sphere models as a freeform surface slice;
   step 3, calculating surface curvature distribution data of the freeform surface slice, and constructing a curvature-overlapping pitch optimization model to perform adaptive trajectory filling on the freeform surface slice to thereby obtain freeform surface scanning trajectories; and
   step 4, performing topological sorting on scanning trajectory points of the freeform surface scanning trajectories to obtain processing trajectories, fitting the processing trajectories to obtain fitted processing trajectories, and driving a robot to perform layered cladding deposition on the freeform surface of the worn body to be repaired according to the fitted processing trajectories, thereby completing the adaptive repair on the freeform surface.

2. The method for the adaptive repair of the freeform surface as claimed in claim 1, wherein the step 1 specifically comprises:
   performing the data discretization individually on a standard workpiece and the worn workpiece to obtain a standard point cloud model and the worn body to be repaired, and calculating difference values between the worn body to be repaired and the standard point cloud model through point-by-point iteration; and
   performing the adaptive segmentation on the worn body to be repaired based on the difference values to thereby obtain the initial reference surfaces.

3. The method for the adaptive repair of the freeform surface as claimed in claim 1, wherein the step 3 specifically comprises:
   based on the surface curvature distribution data, constructing the curvature-overlapping pitch optimization model according to an equal-volume overlapping model;
   setting an initial trajectory plane and a distance threshold, obtaining distance data of discrete points in the freeform surface slice to the initial trajectory plane, judging the distance data of the respective discrete points based on the distance threshold, saving discrete points with the distance data less than the distance threshold, and constructing an initial scanning trajectory based on saved discrete points;
   iteratively calculating overlapping pitch optimization points of respective scanning trajectory points on the initial scanning trajectory, and generating a neighboring overlapping trajectory based on the overlapping pitch optimization points; and
   performing the adaptive trajectory filling on the freeform surface slice based on the neighboring overlapping trajectory, thereby obtaining the freeform surface scanning trajectories.

4. The method for the adaptive repair of the freeform surface as claimed in claim 1, wherein the step 4 specifically comprises:
   performing the topological sorting on the scanning trajectory points of the freeform surface scanning trajectories to obtain topologically sorted scanning trajectory points, using the topologically sorted scanning trajectory points as processing points, inserting safety points between different ones of the freeform surface scanning trajectories based on the processing points to obtain the processing trajectories, fitting the processing trajectories using a non-uniform rational B-spline (NURBS) curve, and performing the adaptive repair on the freeform surface.

5. An electronic device, comprising a memory and a processor, wherein the memory is stored with a computer program, and the processor is configured to execute the computer program to cause the electronic device to perform the method for the adaptive repair of the freeform surface as claimed in claim 1.

6. A computer-readable storage medium, stored with a computer program, wherein the computer program is, when executed by a processor, to implement the method for the adaptive repair of the freeform surface as claimed in claim 1.

\* \* \* \* \*